(12) United States Patent
Pereira Da Silva, Jr. et al.

(10) Patent No.: US 8,378,735 B2
(45) Date of Patent: Feb. 19, 2013

(54) DIE TEMPERATURE SENSOR CIRCUIT

(75) Inventors: Edevaldo Pereira Da Silva, Jr., Campinas (BR); Ricardo Pureza Coimbra, Campinas (BR)

(73) Assignee: Freescale Semiconductor, Inc., Austin, TX (US)

(*) Notice: Subject to any disclaimer, the term of this patent is extended or adjusted under 35 U.S.C. 154(b) by 221 days.

(21) Appl. No.: 12/955,598

(22) Filed: Nov. 29, 2010

(65) Prior Publication Data

US 2012/0133422 A1  May 31, 2012

(51) Int. Cl.
*H01L 35/00* (2006.01)
*H01L 37/00* (2006.01)
*H03K 3/42* (2006.01)
*H03K 17/78* (2006.01)

(52) U.S. Cl. ...................................................... 327/512
(58) Field of Classification Search .................. 327/512
See application file for complete search history.

(56) References Cited

U.S. PATENT DOCUMENTS

| | | | |
|---|---|---|---|
| 4,447,784 A | 5/1984 | Dobkin | |
| 5,170,133 A * | 12/1992 | Pernici | 330/253 |
| 6,373,330 B1 * | 4/2002 | Holloway | 327/539 |
| 6,507,239 B2 * | 1/2003 | Ochi | 327/560 |
| 7,083,328 B2 | 8/2006 | Johnson | |
| 7,170,334 B2 | 1/2007 | Miranda et al. | |
| 7,173,407 B2 * | 2/2007 | Marinca | 323/316 |
| 7,674,035 B2 | 3/2010 | Pertijs et al. | |
| 7,705,662 B2 * | 4/2010 | Ng et al. | 327/539 |
| 7,750,728 B2 * | 7/2010 | Marinca | 327/539 |
| 7,808,298 B1 * | 10/2010 | Modica et al. | 327/513 |
| 7,952,421 B2 * | 5/2011 | Tripodi et al. | 327/513 |
| 2002/0036933 A1 * | 3/2002 | Ochi | 365/200 |
| 2006/0001413 A1 * | 1/2006 | Marinca | 323/315 |
| 2007/0171956 A1 | 7/2007 | Noguchi | |
| 2008/0123238 A1 | 5/2008 | Campos et al. | |
| 2009/0058391 A1 | 3/2009 | Rokos | |
| 2009/0108918 A1 * | 4/2009 | Chellappa | 327/539 |
| 2009/0146725 A1 * | 6/2009 | Kimura | 327/512 |
| 2009/0295465 A1 * | 12/2009 | Tripodi et al. | 327/538 |
| 2010/0231287 A1 * | 9/2010 | Modica et al. | 327/512 |
| 2011/0057718 A1 * | 3/2011 | Snoeij et al. | 327/512 |
| 2012/0099388 A1 * | 4/2012 | Lee | 365/189.09 |
| 2012/0133422 A1 * | 5/2012 | Pereira da Silva et al. | 327/512 |

OTHER PUBLICATIONS

Can, Sumer et al., "A 3 V Thermostat Circuit", IEEE BCTM 6.4, 1996, pp. 105-108.

* cited by examiner

*Primary Examiner* — Adam Houston (57) ABSTRACT

A die temperature sensor circuit (200) includes an amplifier (203) that has first and second stages of amplification and that has bipolar transistors (201 and 202) as an input differential pair. The bipolar transistors have different current densities. A difference between base-emitter voltages of the bipolar transistors is proportional to absolute temperature of the bipolar transistors. The bipolar transistors also provide amplification for the first stage of amplification. Multiple feedback loops maintain a same ratio between the current densities of the bipolar transistors over temperature by changing collector currents that bias the bipolar transistors. A feedback loop includes a second stage of amplification and such feedback loop cancels effect that base currents of the bipolar transistors have on an output signal of the die temperature sensor circuit.

20 Claims, 2 Drawing Sheets

DIE TEMPERATURE SENSOR CIRCUIT

BACKGROUND

1. Field

This invention relates generally to die temperature sensor circuits and more specifically to a die temperature sensor circuit disposed on an integrated circuit.

2. Related Art

Figure 1:
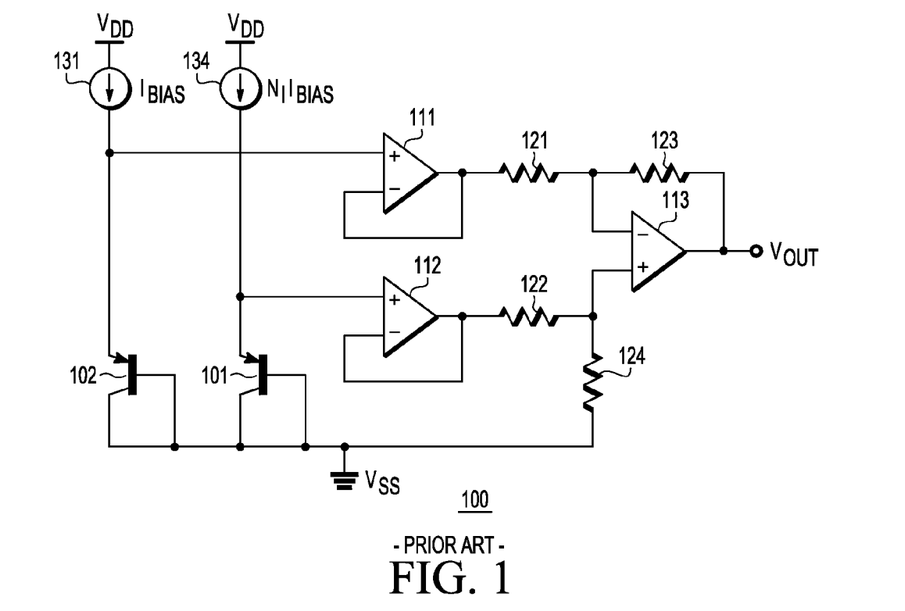
FIG. 1 is a schematic diagram of a known die temperature sensor circuit.

A die temperature sensor circuit outputs a signal that is proportional to absolute temperature (PTAT) of a die on which the die temperature sensor circuit is disposed. FIG. 1 is a schematic diagram of a known die temperature sensor circuit (hereinafter "known sensor circuit") 100. The known sensor circuit 100 comprises three MOS operational amplifiers 111, 112 and 113. MOS operational amplifier 113 is the primary amplifier. MOS operational amplifiers 111 and 112 act as buffers. The known sensor circuit 100 comprises bipolar transistor 101 that has its emitter terminal coupled to a current source 134 with an output current equal to $N_I I_{BIAS}$ and its base and collector terminals coupled to $V_{SS}$. In one known sensor circuit 100, $N_I=4$. The known sensor circuit 100 also comprises bipolar transistor 102 that has its emitter terminal coupled to a current source 131 with an output current equal to $I_{BIAS}$ and its base and collector terminals coupled to $V_{SS}$.

An input signal of the known sensor circuit 100 is a temperature of the known sensor circuit. More specifically, the input signal is a junction temperature of bipolar transistors 101 and 102, which are assumed to have a same temperature. Bipolar transistors 101 and 102 are biased such that their current densities are different and such that a ratio between their current densities remains constant with temperature. A difference between a base-to-emitter voltage of bipolar transistor 101 and a base-to-emitter voltage of bipolar transistor 102, or $\Delta V_{BE}$, is PTAT. A ratio between emitter area of bipolar transistor 102 and emitter area of bipolar transistor 101 is $N_A$. Therefore, the current density of bipolar transistor 101 is $N_I \times N_A$ greater than the current density of bipolar transistor 102. In one known sensor circuit 100, bipolar transistor 101 is one-quarter the size of bipolar transistor 102; therefore, the current density of bipolar transistor 101 is sixteen times greater than the current density of bipolar transistor 102. The term "size" means emitter area.

MOS operational amplifier 113 and resistive elements 121, 122, 123 and 124 correspond to a classical MOS difference amplifier, where resistive elements 121 and 122 have equal values of resistance, and resistive elements 123 and 124 have equal values of resistance. A ratio between resistive elements 123 and 121 is the same as a ratio between resistive elements 124 and 122, and is equal to a gain of the MOS difference amplifier 113. The $\Delta V_{BE}$ is inputted to the MOS difference amplifier 113 via MOS operational amplifiers 111 and 112. The $\Delta V_{BE}$ is amplified by the MOS difference amplifier 113. However, MOS transistors (not shown) are used to implement the input differential pairs of MOS operational amplifiers 111, 112 and 113, and MOS differential pairs disadvantageously have an input offset voltage that creates an error that is multiplied by a gain of its operational amplifier. Furthermore, MOS operational amplifiers 111 and 112 each has its own input offset voltage error which is disadvantageously multiplied by a gain of MOS difference amplifier 113. The input offset voltages of MOS operational amplifiers 111, 112 and 113 are added to the $\Delta V_{BE}$ signal generated by bipolar transistors 101 and 102, and are amplified as an error component. Because the known sensor circuit 100 uses three MOS operational amplifiers, input offset voltages are the biggest contributors of error in the known sensor circuit 100.

Each MOS operational amplifier 111, 112 and 113 has an input offset voltage that varies with temperature in a non-linear manner, and, therefore, in manner that is non-PTAT. Therefore, the input offset voltage errors cannot be corrected by a linear method of calibration. With the known sensor circuit 100, three operational amplifiers 111, 112 and 113 are needed, thereby requiring large die area.

The known sensor circuit 100 comprises a first resistive element 121, a second resistive element 122, a third resistive element 123 and a fourth resistive element 124. Typically, each resistive element corresponds physically to one or more unitary resistors (not shown) connected in parallel and/or in series to produce a desired resistance value. The known sensor circuit 100 depends upon each of the unitary resistors to be of equal value, as measured in ohms. Typically, the first and second resistive elements 121 and 122 each comprises one unitary resistor, and the third and fourth resistive elements 123 and 124 each comprises twenty unitary resistors. The gain of the known sensor circuit 100 is set by a ratio of resistance of the first and second resistive elements 121 and 122 to resistance of the third and fourth resistive elements 123 and 124. The unitary resistors must be precisely matched, i.e., the value of the first resistive element 121 must be equal to the value of the second resistive element 122, and the value of the third resistive element 123 must be equal to the value of the fourth resistive element 124. The ratio of resistance of the first resistive element 121 to resistance of the third resistive element 123 must be well defined and must remain constant regardless of temperature. Also, the ratio of resistance of the second resistive element 122 to resistance of the fourth resistive element 124 must be well defined and must remain constant regardless of temperature. With the known sensor circuit 100, any mismatch among the unitary resistors results in temperature coefficient errors and causes sensitivity to the actual value of $V_{BE}$, i.e., disadvantageously causes common-mode signal amplification.

There are other sources of error, e.g., common-mode rejection ratio and supply rejection, which are highly dependent on temperature. Because these sources of error are highly dependent on temperature, they affect the measurement of the $\Delta V_{BE}$ of bipolar transistor 101 and bipolar transistor 102. If the value of current source $N_I I_{BIAS}$ 134 is not actually $N_I$ times the value of the current source $I_{BIAS}$ 131, where $N_I$ is a constant, significant output error and linearity issues result, which cannot be cancelled by a linear method of calibration.

The bipolar transistor base-to-emitter voltage, $V_{BE}$, is function of the collector current. With the known sensor circuit 100, the bipolar transistors 101 and 102 are biased through the emitter terminals. Therefore, $V_{BE1}$ and $V_{BE2}$ disadvantageously depend on the current gain, $\beta$, which is weakly dependent on temperature and on biasing currents. As a result, $\Delta V_{BE}$ thermal variation is sensitive to $\beta_1$ and $\beta_2$ when $\beta_1 \neq \beta_2$. Therefore, $V_{OUT}$ is disadvantageously sensitive to the $\beta$ of bipolar transistor 101 and to the $\beta$ of bipolar transistor 102. The voltage $\Delta V_{BE}$ has a very low thermal coefficient, typically about 0.1 millivolt per kelvin (mV/K), so it needs to be amplified to produce a desired output voltage.

If resistive elements 121 and 122 are not perfectly equal, and/or if resistive elements 123 and 124 are not perfectly equal, not only would the thermal coefficient disadvantageously change, but also MOS amplifier 113 would disadvantageously amplify a common-mode signal that is temperature dependent, i.e., the output thermal coefficient would be adversely affected in a non-linear manner. In one known sensor circuit 100, resistive elements 121 and 122 each have a resistance R and resistive elements 123 and 124 each have a resistance 20R. In such known sensor circuit 100, if $R \neq R$ and/or 20R≠20R, not only would the thermal coefficient disadvantageously change, but also MOS amplifier 113 would disadvantageously amplify a common-mode signal. Linear calibration cannot compensate for such a non-linear effect on the thermal coefficient.

In another known sensor circuit (not shown), the value of the first and second resistive elements 121 and 122 is set very high to reduce the current flowing through them, the MOS operational amplifiers 111 and 112 are omitted, and the first and second resistive elements are connected directly to the emitter terminals of bipolar transistors 101 and 102. Although this other known sensor circuit (not shown) eliminates the input offset voltage caused by operational amplifiers 111 and 112, the current flowing though the first and second resistive elements 121 and 122, albeit small, flows through bipolar transistors 101 and 102 and distorts the measurement of the absolute temperature.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 2:
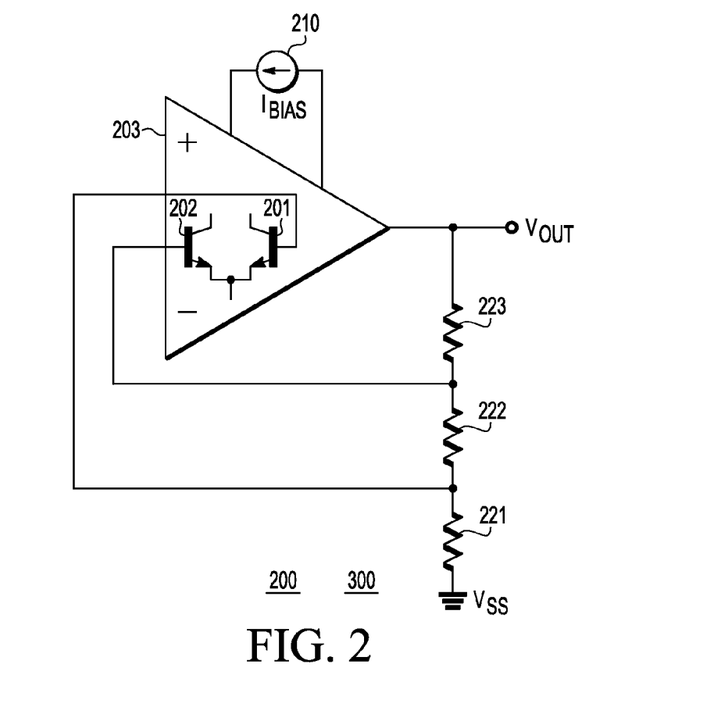
FIG. 2 is a schematic diagram of a die temperature sensor circuit in accordance with the invention.

FIG. 2 is a schematic diagram of a die temperature sensor circuit (hereinafter "sensor circuit") 200 in accordance with the invention. The sensor circuit 200 comprises an amplifier 203 with a PTAT input offset voltage. In one embodiment, the sensor circuit 200 comprises two amplification stages. An input stage, or first stage, of the amplifier 203 comprises bipolar transistors 201 and 202 that are used as an input differential pair. Input terminals of the amplifier 203 are base terminals of the bipolar transistors 201 and 202. An input signal of the sensor circuit 200 is a temperature of the sensor circuit. More specifically, the input signal is a junction temperature of bipolar transistors 201 and 202. In one embodiment, the sensor circuit 200 is disposed on a circuit-supporting substrate, or die, 300 of an integrated circuit. The sensor circuit 200 generates at an output terminal an output voltage $V_{OUT}$ that varies proportionally to absolute temperature of the sensor circuit. Bipolar transistors 201 and 202 are used as inputs of the amplifier 203 to implement the first stage while also producing an input offset voltage for the amplifier 203 that is intrinsically PTAT. This eliminates a need for a MOS transistor input pair, therefore avoiding the input offset voltage error present with operational amplifiers that use gate terminals of MOS transistors as inputs. A difference between a base-to-emitter voltage of bipolar transistor 201 and a base-to-emitter voltage of bipolar transistor 202, or $\Delta V_{BE}$, is PTAT. Advantageously, bipolar transistors 201 and 202 are used not only to produce the $\Delta V_{BE}$ voltage that is amplified but also to implement the first stage of the amplifier 203.

The collector current density of bipolar transistor 201 is different from the collector current density of bipolar transistor 202, and a ratio between these current densities remains constant over temperature in order to produce a PTAT input voltage offset equal to the $\Delta V_{BE}$ voltage. The current density of bipolar transistor 201 is greater than the current density of bipolar transistor 202. Depending on the embodiment, the current density of bipolar transistor 201 can be 2-50 times the current density of bipolar transistor 202. To produce a desired ratio between their current densities, transistors 201 and 202 are biased with different, but proportional, collector currents and/or bipolar transistors 201 and 202 are sized with different emitter areas. Therefore, if bipolar transistors 201 and 202 are of a same size, they have different collector currents, and if bipolar transistors 201 and 202 have same collector currents, they are of different sizes. Also, bipolar transistors 201 and 202 may have different currents and also be of different sizes, so long as they do not have a same current density.

The input differential pair of the amplifier 203 is designed so that the input offset voltage is equal to $\Delta V_{BE}$ of bipolar transistors 201 and 202. Therefore, the input offset voltage is PTAT. Consequently, the output voltage $V_{OUT}$ of the amplifier 203 is an amplified version of the input offset voltage.

In general, for bipolar transistors, the voltage between base and emitter, $V_{BE}$, is temperature dependent and current dependent. In the sensor circuit 200, there is a temperature-dependent voltage at the base of bipolar transistor 201 and a temperature-dependent voltage at the base of bipolar transistor 202. Typically, bipolar transistors 201 and 202 are close to each other on a die 300; therefore, they have almost a same temperature. If the bipolar transistors 201 and 202 had a same current density, then $V_{BE}$ of bipolar transistor 201 would be the same as $V_{BE}$ of bipolar transistor 202, and a difference between $V_{BE}$ of bipolar transistor 201 and $V_{BE}$ of bipolar transistor 202 would be zero. However, in the sensor circuit 200, the bipolar transistors 201 and 202 have different current densities; therefore, the difference between $V_{BE}$ of bipolar transistor 201 and $V_{BE}$ of bipolar transistor 202 is non-zero. A ratio of the current density of bipolar transistor 201 to the current density of bipolar transistor 202 is constant regardless of temperature. The ratio between the current densities of the bipolar transistors 201 and 202 is constant regardless of temperature because the bipolar transistors share a same current source 210 and because the ratios among the current minors of the sensor circuit 200 remain constant over temperature. However, the difference between $V_{BE}$ of bipolar transistor 201 and $V_{BE}$ of bipolar transistor 202 is not constant with temperature. The difference between $V_{BE}$ of bipolar transistor 201 and $V_{BE}$ of bipolar transistor 202 is directly proportional to their junction temperature. Therefore, the difference between the temperature-dependent voltage at the base of bipolar transistor 201 and the temperature-dependent voltage at the base of bipolar transistor 202 is a voltage that is proportional to the absolute temperature of the die 300 regardless of temperature.

Unlike the known sensor circuit 100, bipolar transistors 201 and 202, which generate the temperature-dependent voltage, are within the amplifier 203 of the sensor circuit 200 in accordance with the invention. Bipolar transistors 201 and 202 also form the inputs of the amplifier 203. Therefore, bipolar transistors 201 and 202 perform a dual function of not only generating a PTAT voltage but also being the input differential pair of the amplifier 203.

The sensor circuit 200 includes resistive elements $R_1$ 221, $R_2$ 222 and $R_3$ 223, which are comprised of one or more unitary resistors (not shown) connected in parallel and/or in series to produce a desired resistance value. The currents in the base of bipolar transistor 201 and in the base of bipolar transistor 202 are determined by a resistance divider comprising resistive elements $R_1$ 221, $R_2$ 222 and $R_3$ 223. Base currents, $I_{B1}$ and $I_{B2}$, which are necessary to operate the bipolar transistors 201 and 202, respectively, may distort feedback within the amplifier 203, thereby distorting measurement of the temperature. The feedback is controlled, in part, by resistive elements $R_1$ 221, $R_2$ 222 and $R_3$ 223. To minimize distortion in the feedback, the resistances of resistive elements $R_1$ 221, $R_2$ 222 and $R_3$ 223 have specific ratios to each other. These specific ratios are selected so that the effects that the base currents of bipolar transistors 201 and 202 have on the feedback cancel each other. A feedback structure of the sensor circuit 200 forces the input offset voltage of the amplifier 203 to appear across resistive element $R_2$ 222, thereby amplifying $\Delta V_{BE}$ to produce $V_{OUT}$.

Each of the resistive elements $R_1$ 221, $R_2$ 222 and $R_3$ 223 comprises one or more unitary resistors (not shown). The unitary resistors are laid out on the die 300 in such a way to cancel any effects on their values caused by gradients that occur during fabrication of the integrated circuit embodying the sensor circuit 200. Because of the configuration of the sensor circuit 200, only three resistive elements 221, 222 and 223 are needed. The total resistance (thirty-four unitary resistors in one embodiment) of the three resistive elements $R_1$ 221, $R_2$ 222 and $R_3$ 223 of the sensor circuit 200 is advantageously about half the total resistance of the four resistive elements 121, 122, 123 and 124 of the known sensor circuit 100 (sixty-eight unitary resistors in one embodiment), assuming equal closed-loop gains and equal resistance of the unitary resistors. The sensor circuit 200 advantageously uses only half the number of unitary resistors that the known sensor circuit 100 uses. A smaller total resistance used in the sensor circuit 200 in accordance with the invention compared to a total resistance used in the known sensor circuit 100 means that the sensor circuit 200 in accordance with the invention uses less die area.

Because the sensor circuit 200 uses bipolar transistors 201 and 202 in the first stage of the amplifier 203, most of the error components associated with the input offset voltage of the amplifier are PTAT, and, therefore, the error components can be, and are, cancelled by a linear method of calibration, which results in higher accuracy.

The sensor circuit 200 has only one amplifier 203, which also results in significant reductions in area usage and power consumption.

Figure 3:
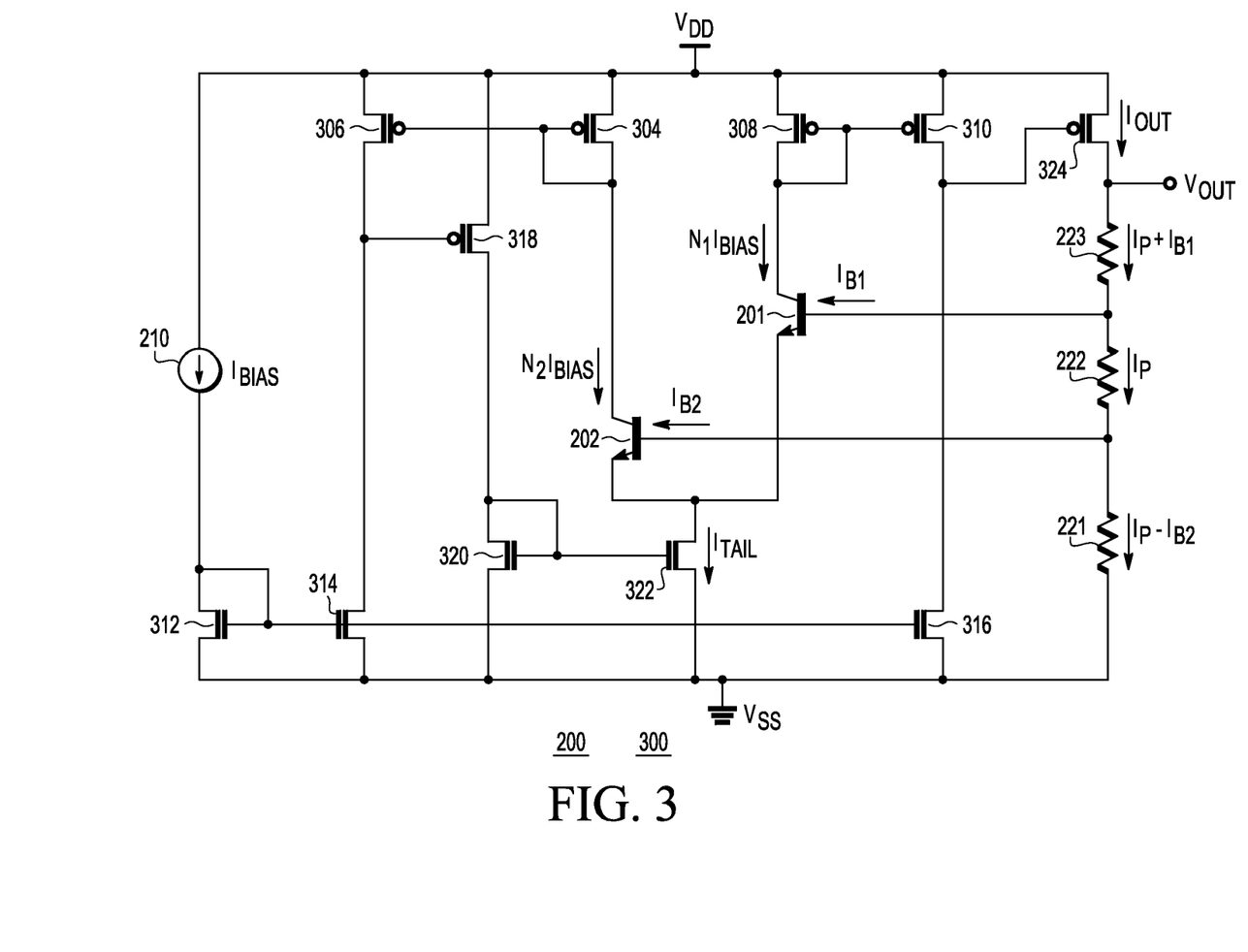
FIG. 3 is a more detailed schematic diagram of the die temperature sensor circuit of FIG. 2.

FIG. 3 is a more detailed schematic diagram of the sensor circuit 200. The sensor circuit 200 includes a PMOS transistor 304 having a source terminal coupled to $V_{DD}$ and a drain terminal coupled to a collector terminal of bipolar transistor 202. In one embodiment, $V_{DD}$ is 2.7V to 5.5V. PMOS transistor 304 is connected as a diode, i.e., with its gate terminal connected to its drain terminal. The gate terminal of PMOS transistor 304 is also coupled to a gate terminal of a PMOS transistor 306. PMOS transistor 306 has its source terminal coupled to $V_{DD}$ and its drain terminal coupled to a drain terminal of an NMOS transistor 314. NMOS transistor 314 has its source terminal coupled to $V_{SS}$. In one embodiment, $V_{SS}$ is at ground potential. NMOS transistor 314 has its gate terminal coupled to a drain terminal of an NMOS transistor 312. NMOS transistor 312 has its drain terminal coupled to a current source $I_{BIAS}$ 210 and its source terminal coupled $V_{SS}$. NMOS transistor 312 is connected is connected as a diode. The sensor circuit 200 includes a PMOS transistor 318 having a gate terminal coupled to the drain terminal of PMOS transistor 306, a source terminal coupled to $V_{DD}$ and a drain terminal coupled to a drain terminal of an NMOS transistor 320. NMOS transistor 320 has its source terminal coupled to $V_{SS}$ and has its gate terminal coupled to its drain terminal.

The sensor circuit 200 also includes a PMOS transistor 308 having a source terminal coupled to $V_{DD}$ and a drain terminal coupled to a collector terminal of bipolar transistor 201. PMOS transistor 308 has its gate terminal connected to its drain terminal. The gate terminal of PMOS transistor 308 is also coupled to a gate terminal of a PMOS transistor 310. PMOS transistor 310 has its source terminal coupled to $V_{DD}$ and its drain terminal coupled to a drain terminal of an NMOS transistor 316. NMOS transistor 316 has its source terminal coupled to $V_{SS}$ and its gate coupled to the gate of NMOS transistor 312. The sensor circuit 200 further includes an NMOS transistor 322 that has its drain coupled to an emitter terminal of bipolar transistor 201 and to an emitter terminal of bipolar transistor 202. NMOS transistor 322 has its gate coupled to the gate of NMOS transistor 320 and its source coupled to $V_{SS}$.

In addition, the sensor circuit 200 includes a PMOS transistor 324 having a source terminal coupled to $V_{DD}$ and a gate terminal coupled to the drain terminal of PMOS transistor 310. The sensor circuit 200 includes resistive elements $R_1$ 221, $R_2$ 222 and $R_3$ 223 that are connected in series, with one end of the series coupled to a drain terminal of PMOS transistor 324 and with the other end of the series coupled to $V_{SS}$. A node between resistive elements $R_3$ 223 and $R_2$ 222 is coupled to a base terminal of bipolar transistor 201. A node between resistive elements $R_2$ 222 and $R_1$ 221 is coupled to a base terminal of bipolar transistor 202. The output terminal of the sensor circuit 200 is coupled to the drain terminal of PMOS transistor 324.

The feedback structure of the sensor circuit 200 controls a tail current $I_{TAIL}$ of the bipolar transistors 201 and 202 so that currents through bipolar transistors 201 and 202 have a specific proportion between them. The feedback structure of the sensor circuit 200 forces the collector currents of bipolar transistors 201 and 202 to have desired values, directly related to $I_{BIAS}$, thereby reducing the sensitivity of $\Delta V_{BE}$ to variations in current gain ($\beta$) of bipolar transistors 201 and 202. To accomplish the specific proportion, the currents through PMOS transistors 304 and 308 (which are also the collector currents of bipolar transistor 202 and 201, respectively) are mirrored in the sensor circuit 200 and are compared to $I_{BIAS}$. Bipolar transistors 201 and 202 are biased through their collector terminals, and the sensor circuit 200 directly controls the collector currents of bipolar transistors 201 and 202. Biasing the bipolar transistors 201 and 202 through collector terminals also desensitizes $\Delta V_{BE}$ to the value of $\beta$. Controlling $I_{TAIL}$ also allows the sensor circuit 200 to operate at a lower $V_{DD}$ than would otherwise be possible and still perform properly. The feedback structure of the sensor circuit 200 automatically sets $I_{TAIL}$ to bias bipolar transistors 201 and 202 to ensure a desired proportion of current on the collector of bipolar transistor 201 compared to current on the collector of bipolar transistor 202. The collector currents of bipolar transistors 201 and 202 are proportional to $I_{BIAS}$. $I_{TAIL}$ drains not only the collector currents of bipolar transistors 201 and 202, but also the base currents of bipolar transistors 201 and 202. Base currents of bipolar transistors 201 and 202 depend on $\beta$. $I_{TAIL}$ is adjusted, by feedback, to drain the collector currents and the base currents of bipolar transistors 201 and 202 regardless of $\beta$, thereby helping to make $V_{OUT}$ insensitive to the $\beta$ of bipolar transistor 201 or the $\beta$ of bipolar transistor 202.

The current in NMOS transistor 312 is $I_{BIAS}$. The current in NMOS transistor 312 is mirrored in NMOS transistor 314, i.e., the current through NMOS transistor 314 is equal to a current mirror gain of NMOS transistor 314 multiplied by $I_{BIAS}$. When the sensor circuit 200 stabilizes, PMOS transistor 306 has a same current as NMOS transistor 314. Therefore, after the sensor circuit 200 stabilizes, the current through PMOS transistor 304, and hence through the collector of bipolar transistor 202, is equal to an equivalent current minor gain (between transistors 304 and 306) multiplied by $I_{BIAS}$. A current through NMOS transistor 316 has a direct relationship to $I_{BIAS}$. The current through NMOS transistor 316 is equal to a current minor gain of NMOS transistor 316 multiplied by $I_{BIAS}$. NMOS transistors 314 and 316 act as constant current sources for feedback amplifying stages.

The current through PMOS transistor 310 and the current through NMOS transistor 316 are the same current. Therefore, the current through PMOS transistor 310 has a direct relationship to $I_{BIAS}$. The current through PMOS transistor 310 is equal to an equivalent current minor gain of PMOS transistor 310 multiplied by $I_{BIAS}$. Consequently, the current through PMOS transistor 308 also has a direct relationship to $I_{BIAS}$.

The collector current of bipolar transistor 202 is measured indirectly by measuring the current through PMOS transistor 304, which is compared with $I_{BIAS}$. This comparison generates a voltage at a gate of PMOS transistor 318 resulting in a current that biases gate terminals of NMOS transistors 320 and 322, thereby controlling the tail current $I_{TAIL}$ through NMOS transistor 322. When NMOS transistor 322 operates in the saturation region, NMOS transistors 320 and 322 act similar to a current minor. When NMOS transistor 322 operates in the triode region (because of a low voltage level at its drain terminal), the feedback structure of the sensor circuit 200 forces a higher current through NMOS transistor 320 to compensate for a loss in current gain from NMOS transistor 320 to NMOS transistor 322. When NMOS transistor 322 operates in the triode region, NMOS transistors 320 and 322 act very differently from a current minor. No error derives from such lack of current mirroring.

PMOS transistors 306 and 304 are not necessarily of a same size. Therefore, if the current through PMOS transistor 306 is $I_{BIAS}$, the current through PMOS transistor 304 is, in general, $N_2 \times I_{BIAS}$ (assuming PMOS transistor 304 is $N_2$ times larger than PMOS transistor 306).

The sizes of the NMOS transistors are decoupled from the sizes of the PMOS transistors. When the voltage at the gate of PMOS transistor 318 is stable, the currents through those current minors will be directly related to $I_{BIAS}$. When the sensor circuit 200 is stable, the current through the collector of the bipolar transistor 201 is of the form $N_2 \times I_{BIAS}$, where $N_2$ is a ratio of the current mirrors formed by PMOS transistors 306 and 304 and NMOS transistors 312 and 314.

PMOS transistors 306 and 304, PMOS transistors 308 and 310, and NMOS transistors 312, 314 and 316 represent current minors. In another embodiment (not shown) of the sensor circuit 200, cascode current minors are used instead of PMOS transistors 306 and 304, PMOS transistors 308 and 310, and NMOS transistors 312, 314 and 316. In yet other embodiments (not shown) of the sensor circuit 200, complex circuits including operational amplifiers may be used as current minors instead of PMOS transistors 306 and 304, PMOS transistors 308 and 310, and NMOS transistors 312, 314 and 316.

The feedback structure of the sensor circuit 200 comprises a first current loop and a second current loop. PMOS transistors 304, 306 and 318, NMOS transistors 320 and 322, and bipolar transistor 202 form the first current loop. The current in PMOS transistor 304 is mirrored in PMOS transistor 306. PMOS transistor 304 and PMOS transistor 306 have a size ratio of $N_2$. In one embodiment, $N_2$=2. The first current loop forces $I_{TAIL}$ to a value such that the collector current $I_{C2}$ of bipolar transistor 202 is equal to $I_{BIAS}$ (or equal to $N_2 \times I_{BIAS}$, if PMOS transistor 304 is $N_2$ times larger than PMOS transistor 306). In general, $N_2$=size of NMOS transistor 314×size of PMOS transistor 304/size of NMOS transistor 312×size of PMOS transistor 306.

PMOS transistors 308, 310 and 324, resistive element $R_3$ 223, and bipolar transistor 201 form the second current loop. The second current loop controls the output voltage $V_{OUT}$. The current in PMOS transistor 308 is mirrored in PMOS transistor 310. PMOS transistors 310 and 308 have a size ratio of $N_1$. In one embodiment, $N_1$=5. The second current loop formed adjusts $I_{OUT}$ to a value such that the collector current $I_{C1}$ of bipolar transistor 201 is equal to $N_1 I_{BIAS}$. In the second loop, the amount of feedback depends upon values of resistive elements $R_1$ 221, $R_2$ 222 and $R_3$ 223. PMOS transistor 310 causes the collector current of bipolar transistor 201 to follow a certain relationship with $I_{BIAS}$. The second current loop forces a voltage on the gate of PMOS transistor 324, which is a voltage needed for $V_{OUT}$ to have a linear absolute temperature characteristic. In general, $N_1$=size of NMOS transistor 316×size of PMOS transistor 308/size of NMOS transistor 312×size of PMOS transistor 310.

In one embodiment, a conductivity type of bipolar transistors 201 and 202 is NPN. The configuration of the sensor circuit 200 allows access to the collector terminals of bipolar transistors 201 and 202, which permits direct control of their collector currents. The first and second current loops, working together, directly control the collector currents of bipolar transistors 201 and 202. It is advantageous to control current that flows into a collector terminal of a bipolar transistor (rather than current that flows into an emitter terminal, such as in the known sensor circuit 100) because $\Delta V_{BE}$ is a function of the ratio of collector currents of bipolar transistors 201 and 202.

From the well known Shockley equation, it can be shown that $$\Delta V_{BE} = V_{BE1} - V_{BE2} = \frac{kT}{q} \ln\left(\frac{I_{C1}}{I_{C2}} \cdot \frac{A_{E2}}{A_{E1}}\right) \qquad \text{Equation (1)}$$

where T is the temperature measured in kelvins (abbreviated "K", and sometimes informally referred to as "degrees Kelvin"), q is the magnitude of the electrical charge of an electron ($1.6022 \times 10^{-19}$ coulombs), k is the Boltzmann's constant ($1.3807 \times 10^{-23}$ joules per kelvin), and $A_{E1}$ and $A_{E2}$ are the emitter areas of bipolar transistors 201 and 202, respectively. The term kT/q is called the thermal voltage and has a value of approximately 25.85 mV at room temperature (approximately 300K). At room temperature, the thermal voltage changes at a rate of approximately 0.0862 mV/K.

A collector current density $J_1$ of bipolar transistor 201 is different from a collector current density $J_2$ of bipolar transistor 202. In one embodiment, $J_1/J_2$=36. In one embodiment, bipolar transistors 201 and 202 have different collector current densities because their emitter areas are different. In such one embodiment, $A_{E1}/A_{E2}$=10/4. In another embodiment, bipolar transistors 201 and 202 have different collector current densities because their collector currents are different. Bipolar transistors 201 and 202 are biased with collector current densities $J_1 = N_1 I_{BIAS}/Ae1$ and $J_2 = N_2 I_{BIAS}/Ae2$ with $J_1/J_2 = N_1/N_2$ constant. This results in a difference between the base-to-emitter voltages ($\Delta V_{BE} = V_{BE1} - V_{BE2}$) that is PTAT, which is applied to resistive element $R_2$ 222. The feedback structure of the sensor circuit 200 amplifies $\Delta V_{BE}$, thereby producing a PTAT output voltage $V_{OUT}$ with an appropriately higher thermal coefficient. In one embodiment, such appropriately higher thermal coefficient is approximately 5.6 millivolt per kelvin (mV/K).

In order for $\Delta V_{BE}$ to be PTAT, there should be a constant ratio between the current densities of bipolar transistors 201 and 202, regardless of temperature. In the expression for $\Delta V_{BE}$ for the sensor circuit 200, there is a term for the collector current. However, as can be seen from Equation (1) above, the expression for $\Delta V_{BE}$ advantageously does not include a term for $\beta$.

Due to the first and second current loops, there is a voltage difference ($\Delta V_{BE}$) between the voltage at the base of bipolar transistor 201 and the voltage at the base of bipolar transistor 202 that is proportional to the absolute temperature. In the sensor circuit 200, $I_{B1}=N_1 \times I_{BIAS}/\beta$. If $I_{B1}$ and $I_{B2}$ were zero, then $\Delta V_{BE}$ would also appear across resistive element $R_2$ 222. However, in the sensor circuit 200, $I_{B1}$ and $I_{B2}$ are non-zero, and $I_{B1}$ and $I_{B2}$ modify the currents through, and the voltages across, resistive element $R_1$ 221 and resistive element $R_3$ 223. The sizes of resistive element $R_1$ 221 and resistive element $R_3$ 223 are selected so that a voltage increase across resistive element $R_3$ 223 (due to the presence of $I_{B1}$) is counteracted by a voltage decrease across resistive element $R_1$ 221 (due to the absence of $I_{B2}$), and, as a result, $V_{OUT}$ is proportional to $\Delta V_{BE}$ in spite of $I_{B1}$ and $I_{B2}$ being non-zero.

The accuracy by which $V_{OUT}$ tracks the absolute temperature depends upon the values of resistive elements $R_1$ 221, $R_2$ 222 and $R_3$ 223. In one embodiment, resistive element $R_1$ 221 has about 10-20 times the resistance of resistive element $R_2$ 222, and resistive element $R_3$ 223 has about 10-20 times the resistance of resistive element $R_2$ 222. The resistances of resistive element $R_1$ 221 and resistive element $R_3$ 223 are not necessarily equal because $I_{B1}$ is typically not equal to $I_{B2}$.

An output stage, or second stage, of the amplifier 203 comprises PMOS transistor 324. The strength, relative to the desired temperature-dependent signal, of error sources that appear after the first stage of the amplifier 203 is reduced by the high gain (compared to MOS transistors) of the bipolar transistors 201 and 202 in the first stage of the amplifier.

The output branch comprises PMOS transistor 324, and resistive elements $R_1$ 221, $R_2$ 222 and $R_3$ 223. The current $I_p$ through resistive element $R_2$ 222 is approximately PTAT and would be exactly PTAT if the resistance of resistive element $R_2$ 222 did not vary with temperature. In one embodiment, $I_p$ is approximately 300 µA. A larger $I_p$ results in a faster sensor circuit 200. The sensor circuit 200 compensates for the presence of the base currents of bipolar transistors 201 and 202 in the output branch. The sizes of resistive elements 223 and 221 are selected to cancel the effect of the base currents of bipolar transistors 201 and 202 in the output branch. Sizes of resistive elements 223 and 221 are chosen so that $R_3 \times I_{B1} = R_1 \times I_{B2}$. Sizes of resistive elements 223 and 221 are chosen by taking into account the relative collector currents of bipolar transistors 201 and 202.

Total resistance of resistive elements $R_1$ 221, $R_2$ 222 and $R_3$ 223 affects the gain of the second stage of the sensor circuit 200. The voltage across resistive elements $R_2$ 222 is added to the voltage across resistive element $R_1$ 221 and the voltage across resistive element $R_3$ 223 to create a gain at $V_{OUT}$ at a higher amplitude than an amplitude that would have been created if resistive element $R_1$ 221 and resistive element $R_3$ 223 were not present. In one embodiment, the gain factor of the second stage is approximately "21". A relationship between resistive element $R_3$ 223 and resistive element $R_1$ 221 is imposed by a relationship between the collector currents of bipolar transistors 201 and 202, respectively. The sensor circuit 200 cancels any effect that base currents of bipolar transistors 201 and 202 have on the output voltage $V_{OUT}$. If the relationship between resistive element $R_3$ 223 and resistive element $R_1$ 221 is made to follow the relationship between the collector currents of bipolar transistors 201 and 202, then the effect of the base currents on the output branch is cancelled.

The base currents $I_{B1}$ and $I_{B2}$ are taken into account by making $R_3/R_1 = N_2/N_1$, to cancel their effect. The resistive elements $R_1$ 221, $R_2$ 222 and $R_3$ 223 define a slope of the output voltage $V_{OUT}$ and cancel an error caused by base currents and base current variation with temperature, as demonstrated by the following equations.

$$I_P = \Delta V_{BE} / R_2$$

$$I_{B1} = I_{C1}/\beta_1 = N_1 I_{BIAS}/\beta_1$$

$$I_{B2} = I_{C2}/\beta_2 = N_2 I_{BIAS}/\beta_2$$

$$V_{OUT} = R_1 \cdot (I_P - I_{B2}) + R_2 \cdot I_P + R_3 \cdot (I_P + I_{B1})$$

$$V_{OUT} = \frac{R_1 + R_2 + R_3}{R_2} \cdot \Delta V_{BE} + \left(R_3 \cdot \frac{N_1}{\beta_1} - R_1 \cdot \frac{N_2}{\beta_2}\right) \cdot I_{BIAS}$$

By making $R_3/R_1 = N_2/N_1$, the effect of base current on the output voltage $V_{OUT}$ is cancelled for $\beta_1 = \beta_2$. In the event there is some $\beta$ mismatch, $I_P$ is made much larger than the base currents $I_{B1}$ and $I_{B2}$, thereby practically eliminating error due to $\beta$ mismatch. Hence, $V_{OUT}$ can be made PTAT and given by:

$$V_{OUT} = \frac{R1 + R2 + R3}{R2} \cdot \frac{k}{q} \cdot \ln\left(\frac{N_1}{N_2} \cdot \frac{A_{E2}}{A_{E1}}\right) \cdot T$$

The ratio $R_1/R_3$ is proportional to the ratio $N_1 I_{BIAS}/N_2 I_{BIAS}$. In one embodiment, the collector current of bipolar transistor 201 is four times the collector current of bipolar transistor 202.

It would be ideal if $\beta_1 = \beta_2$. However, because of process variation, $\beta_1 \neq \beta_2$. However, the effect of this inequality is minimized by making the $I_P$ current, which is a component of the current in the output branch, much larger than the $I_{B1}$ current and the $I_{B2}$ current, which are the other components of the current in the output branch. By making the $I_P$ current much larger than the $I_{B1}$ current and the $I_{B2}$ current, any error produced by $\beta_1 \neq \beta_2$ is negligible. The $I_P$ current is made larger by decreasing the total resistance of resistive elements $R_1$ 221, $R_2$ 222 and $R_3$ 223.

In one embodiment, the sensor circuit 200 achieves a sigma ($\sigma$) of 0.04° K and achieves one-degree accuracy. The known sensor circuit 100 achieves a worse $\sigma$ of 0.3° K. The known sensor circuit 100 cannot achieve one-degree accuracy. The sensor circuit 200 in accordance with the invention is at least seven times more accurate than the known sensor circuit 100. The sensor circuit 200 compensates for the largest error sources present in known sensor circuits and is insensitive to the most important transistor non-idealities. The sensor circuit 200 provides improved accuracy, improved linearity, low-voltage operation and reduced area when compared to known sensor circuits in advanced CMOS technologies, and is able to operate in the full temperature span of a given process technology.

The sensor circuit 200 has a thermal coefficient of about 5 mV/K. The output voltage $V_{OUT}$ of the sensor circuit 200 increases by about 5 mV for every degree of temperature increase. If resistive elements $R_1$ 221, $R_2$ 222 and $R_3$ 223 of the sensor circuit 200 do not have precise ratios, the thermal coefficient may spread. However, most of the times, this results after a gain shift, and can be adjusted by calibration. Advantageously, imprecise ratios of resistive elements $R_1$ 221, $R_2$ 222 and $R_3$ 223 would merely have a linear, and not a non-linear, effect on the thermal coefficient. Advantageously, the rate of change of $V_{OUT}$ is linear, and linear compensation can compensate for the spread.

The sensor circuit 200 performs high accuracy temperature sensing without calibration. The sensor circuit 200 can be calibrated to further improve its accuracy.

The sensor circuit 200 provides a low-impedance output terminal, i.e., the sensor circuit can drive resistive and/or capacitive loads. The output voltage $V_{OUT}$ of the second stage of the sensor circuit 200 can be optimized to drive an analog-to-digital converter or similar highly capacitive loads.

The implementation of the current mirror formed by NMOS transistors 312, 314 and 316, of the current mirror formed by PMOS transistors 304 and 306, and of the current mirror formed by PMOS transistors 308 and 310 is not restricted to the transistor arrangements shown. Any circuit arrangement that provides current mirroring functionality could be used.

Although the invention has been described with respect to specific conductivity types or polarity of potentials, skilled artisans appreciated that conductivity types and polarities of potentials may be reversed.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims Unless stated otherwise, terms such as "first" and "second" are used to arbitrarily distinguish between the elements such terms describe. Thus, these terms are not necessarily intended to indicate temporal or other prioritization of such elements. Note that the term "couple" has been used to denote that one or more additional elements may be interposed between two elements that are coupled.

Although the invention is described herein with reference to specific embodiments, various modifications and changes can be made without departing from the scope of the present invention as set forth in the claims below.

What is claimed is:

1. A temperature sensor, comprising:
    an amplifier, the amplifier including a first bipolar transistor and a second bipolar transistor configured as an input differential pair of the amplifier, the first bipolar transistor having a first collector current density, and the second bipolar transistor having a second collector current density different from the first collector current density of the first bipolar transistor, wherein the amplifier is configured such that, when the first and second bipolar transistor having a same temperature, an input offset voltage is equal to a voltage difference between a base-to-emitter voltage of the first bipolar transistor and a base-to-emitter voltage of the second bipolar transistor, such voltage difference being proportional to absolute temperature; and
    an output stage for amplifying such voltage difference, the output stage including
        an output transistor having a control electrode coupled to the amplifier, a first current electrode coupled to a first power supply voltage terminal, and a second current electrode, and
        a resistance divider comprising resistive element $R_1$, resistive element $R_2$ and resistive element $R_3$, respectively, connected in series, with one end of the series coupled the second current electrode of the output transistor and with another end of the series coupled to a second power supply voltage terminal, wherein the temperature sensor generates, at an output terminal, a voltage $V_{OUT}$ that varies proportionally with temperature of the temperature sensor.

2. The temperature sensor of claim 1, in which output voltage $V_{OUT}$ varies proportionally to the absolute temperature of a base-emitter junction temperature of the first and second bipolar transistors.

3. The temperature sensor of claim 1, in which the input differential pair of the amplifier has an input offset voltage that is proportional to absolute temperature.

4. The temperature sensor of claim 1, including a first feedback loop coupled to the first bipolar transistor, and a second feedback loop coupled to the second bipolar transistor, wherein the first and second feedback loops maintain a ratio between collector current densities of the first and second bipolar transistors constant regardless of temperature.

5. The temperature sensor of claim 4, in which the first and second bipolar transistors are biased by a same collector current and in which an emitter area of the second bipolar transistor is larger than another emitter area of the first bipolar transistor.

6. The temperature sensor of claim 4, in which the first and second bipolar transistors have a same emitter area ratio and in which a collector current that biases the first bipolar transistor is larger than another collector current that biases the second bipolar transistor.

7. The temperature sensor of claim 4, wherein the first and second bipolar transistors are biased through their collector terminals, and wherein the first and second feedback loops compare collector currents of the first and second bipolar transistors, respectively, with a current source $I_{BIAS}$, and, in response to such comparison, set the collector current of the first bipolar transistor to $N_1 I_{BIAS}$ and set the collector current of the second bipolar transistor to $N_2 I_{BIAS}$, where $N_1$ and $N_2$ are current mirror ratios of current minors in the feedback loops, respectively.

8. The temperature sensor of claim 1, in which the first and second bipolar transistors are of an NPN conductivity type that are biased through their collector terminals, and in which the temperature sensor circuit directly controls the collector currents of bipolar transistors such that a ratio between current densities of the first and second bipolar transistors remains constant regardless of temperature.

9. An integrated circuit, comprising:
    a circuit-supporting substrate, the circuit-supporting substrate including:
    a differential pair stage including a first bipolar transistor and a second bipolar transistor, the first and second bipolar transistor disposed near each other on the circuit-supporting substrate so that they have nearly a same temperature, the first and second bipolar transistors having different current densities, the differential pair stage for generating a signal proportional to absolute temperature (PTAT), the signal being a voltage difference between base-to-emitter voltage of the first bipolar transistor and base-to-emitter voltage of the second bipolar transistor;
    a first feedback loop, coupled to the differential pair stage, to maintain a value for collector current through of the first bipolar transistor;

a second feedback loop, coupled to the differential pair stage, to maintain a value for collector current of the second bipolar transistor, the second feedback loop including:
- an output stage for amplifying a PTAT signal from the differential pair stage and for providing an output signal proportional to absolute temperature at an output terminal, the output stage including
  - an output transistor having a control electrode coupled to the differential pair stage, a first current electrode coupled to a first power supply voltage terminal, and a second current electrode, and
  - a resistance divider comprising resistive element $R_1$, resistive element $R_2$ and resistive element $R_3$, respectively, connected in series, with one end of the series coupled the second current electrode of the output transistor and with another end of the series coupled to a second power supply voltage terminal,
- wherein the first and second feedback loops maintain a ratio between current densities of the first and second bipolar transistors regardless of temperature; and
- an output terminal for providing an output signal that is representative of temperature of the integrated circuit.

10. The integrated circuit of claim 9, wherein the first and second bipolar transistors are biased through their collector terminals, and where the first and second feedback loops compare collector currents of the first and second bipolar transistors, respectively, with a current $I_{BIAS}$, and, in response to such comparison, set the collector current of the first bipolar transistor to $N_1 I_{BIAS}$ and set the collector current of the second bipolar transistor to $N_2 I_{BIAS}$, where $N_1$ and $N_2$ are current mirror ratios of current minors in the feedback loops, respectively.

11. The integrated circuit of claim 10, wherein the second feedback loop also controls an amplification factor for the output signal.

12. The integrated circuit of claim 10, the first feedback loop also controls a combined tail current of the first and second bipolar transistors.

13. A temperature sensor circuit, comprising:
- a first amplification stage including an input differential pair, the input differential pair including a first bipolar transistor having a base-to-emitter voltage and a second bipolar transistor having a base-to-emitter voltage, the first amplification stage configured so that the first and second bipolar transistors can have a same temperature when operating, the input differential pair for generating a signal proportional to absolute temperature (PTAT) and for amplifying a differential input signal;
- a first feedback loop, coupled to the differential pair, for controlling a collector current of the first bipolar transistor; and
- a second feedback loop, coupled to the differential pair, for controlling a collector current of the second bipolar transistor, the second feedback loop including:
  - a second amplification stage for amplifying a PTAT signal from the first amplification stage and for providing an output signal proportional to absolute temperature at an output terminal, the second amplification stage including
    - an output transistor having a control electrode coupled to the first amplification stage, a first current electrode coupled to a first power supply voltage terminal, and a second current electrode,
    - a resistance divider comprising resistive element $R_1$, resistive element $R_2$ and resistive element $R_3$, respectively, connected in series, with one end of the series coupled the second current electrode of the output transistor and with another end of the series coupled to a second power supply voltage terminal, and
    - an output terminal at the second current electrode for providing a signal representative of absolute temperature of the temperature sensor circuit,
  - wherein the first and second feedback loops maintain a constant ratio between collector current densities of the first and second bipolar transistors, regardless of temperature.

14. The temperature sensor circuit of claim 13, wherein each end of resistive element $R_2$ is coupled to the first amplification stage such that a difference between the base-to-emitter voltage of the first bipolar transistor and the base-to-emitter voltage of the second bipolar transistor appears across resistive element $R_2$.

15. The temperature sensor circuit of claim 14, wherein resistance values of resistive element $R_1$, resistive element $R_2$ and resistive element $R_3$ are selected to compensate for presence, in the second amplification stage, of a base current of the first bipolar transistor and of another base current of the second bipolar transistor.

16. The temperature sensor circuit of claim 13, wherein the first and second bipolar transistors are biased through their collector terminals, and where the first and second feedback loops compare currents through the collector terminals of the first and second bipolar transistors, respectively, with a current source $I_{BIAS}$, and, in response to such comparison, set the collector current of the first bipolar transistor to $N_1 I_{BIAS}$ and set the collector current of the second bipolar transistor to $N_2 I_{BIAS}$, where $N_1$ and $N_2$ are current mirror ratios of current mirrors in the feedback loops, respectively.

17. The temperature sensor circuit of claim 13, wherein a difference between the base-to-emitter voltage of the first bipolar transistor and the base-to-emitter voltage of the second bipolar transistor is an input offset voltage of the amplifier.

18. The temperature sensor circuit of claim 13, wherein the first and second bipolar transistors have different collector current densities.

19. The temperature sensor circuit of claim 14, in which the collector current density of the first bipolar transistor is greater than the collector current density of the second bipolar transistor.

20. The integrated circuit of claim 9, wherein the second feedback loop cancels any effect that base currents of the first and second bipolar transistors have on the signal at the output terminal.

* * * * *

UNITED STATES PATENT AND TRADEMARK OFFICE
CERTIFICATE OF CORRECTION

PATENT NO. : 8,378,735 B2
APPLICATION NO. : 12/955598
DATED : February 19, 2013
INVENTOR(S) : Edevaldo Pereira Da Silva, Jr. et al.

Page 1 of 1

It is certified that error appears in the above-identified patent and that said Letters Patent is hereby corrected as shown below:

Col. 11, in claim 1, line 56:

change "transistor having" to --transistors have--.

Col. 12, in claim 9, line 56:

change "transistor" to --transistors--.

Col. 12, in claim 9, line 66:

delete "through".

Col. 13, in claim 12, line 39:

change "of claim 10, the first" to --of claim 10, wherein the first--.

Signed and Sealed this
Second Day of April, 2013

Teresa Stanek Rea
*Acting Director of the United States Patent and Trademark Office*